(12) United States Patent
Leonard

(10) Patent No.: US 8,066,265 B2
(45) Date of Patent: Nov. 29, 2011

(54) GAS SUSPENSION MEMBER AND METHOD

(75) Inventor: Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 596 days.

(21) Appl. No.: 12/263,175

(22) Filed: Oct. 31, 2008

(65) Prior Publication Data

US 2010/0109212 A1    May 6, 2010

(51) Int. Cl.
*F16F 9/43* (2006.01)
(52) U.S. Cl. .................... 267/64.28; 267/34; 267/190
(58) Field of Classification Search ............. 267/64.16, 267/64.19, 64.24, 64.23, 64.27, 64.28; 285/322, 285/323, 243
See application file for complete search history.

(56) References Cited

U.S. PATENT DOCUMENTS

| | | | |
|---|---|---|---|
| 2,960,333 A | 11/1960 | McGavern, Jr. et al. | |
| 2,989,301 A * | 6/1961 | Johannsen | 267/34 |
| 3,081,075 A | 3/1963 | Selman | |
| 3,584,856 A | 6/1971 | Debois et al. | |
| 3,599,954 A * | 8/1971 | Yew | 267/44 |
| 3,727,899 A | 4/1973 | Pemberton | |
| 3,876,193 A | 4/1975 | Clary | |
| 3,909,036 A | 9/1975 | Pound | |
| 4,470,164 A | 9/1984 | Soderstrom et al. | |
| 4,621,796 A | 11/1986 | Fresch et al. | |
| 4,715,107 A | 12/1987 | Fresch et al. | |
| 4,733,692 A | 3/1988 | Kotake et al. | |
| 4,766,628 A | 8/1988 | Walker | |
| 4,899,995 A | 2/1990 | Hoffman et al. | |
| 5,234,203 A | 8/1993 | Smith | |
| 5,314,045 A | 5/1994 | Fenn et al. | |
| 5,468,028 A | 11/1995 | Olson | |
| 5,518,225 A | 5/1996 | Gubitz | |
| 5,588,640 A | 12/1996 | Romer | |
| 5,671,907 A | 9/1997 | Arnold | |
| 5,681,061 A | 10/1997 | Olson | |
| 5,683,120 A | 11/1997 | Brock et al. | |
| 5,722,696 A | 3/1998 | Taneya | |
| 5,975,506 A | 11/1999 | Thurow et al. | |
| 6,006,873 A | 12/1999 | Kirst | |
| 6,102,378 A * | 8/2000 | Gieseler et al. | 267/34 |
| 6,123,325 A | 9/2000 | Buchanan et al. | |

(Continued)

FOREIGN PATENT DOCUMENTS

JP    05-052231    3/1993

(Continued)

OTHER PUBLICATIONS

WO 2010/051144 A3 and corresponding International Search Report.

*Primary Examiner* — Melanie Torres Williams
(74) *Attorney, Agent, or Firm* — Fay Sharpe LLP

(57) ABSTRACT

A gas suspension member includes a first section and a second section. The first section includes an end wall and a side wall that at least partially form an inner chamber. An opening is formed through the end wall. A connector fitting is embedded within a cover wall that extends across the opening. The end wall has a first flexural stiffness and the cover wall has a second flexural stiffness that is greater than the first flexural stiffness of the end wall. A gas suspension assembly includes a first spring device used in combination with the gas suspension member. A method of forming a gas suspension member is also disclosed.

21 Claims, 7 Drawing Sheets

U.S. PATENT DOCUMENTS

| | | |
|---|---|---|
| 6,145,894 A | 11/2000 | Myers |
| 6,164,314 A | 12/2000 | Saputo et al. |
| 6,170,887 B1 | 1/2001 | Salomon-Bahls et al. |
| 6,199,837 B1 | 3/2001 | Leonard et al. |
| 6,206,604 B1 | 3/2001 | Dembowsky et al. |
| 6,332,602 B1 | 12/2001 | Oishi |
| 6,371,462 B2 | 4/2002 | Gennesseaux |
| 6,454,248 B2 | 9/2002 | Pradel |
| 6,457,702 B1 | 10/2002 | Oishi |
| 6,554,323 B1 | 4/2003 | Salomon-Bahls et al. |
| 6,814,639 B1 | 11/2004 | Peterson |
| 2001/0024004 A1 | 9/2001 | Pradel |
| 2006/0091592 A1 | 5/2006 | Leonard |

FOREIGN PATENT DOCUMENTS

| | | |
|---|---|---|
| JP | 2008-157343 | 7/2008 |

* cited by examiner

GAS SUSPENSION MEMBER AND METHOD

BACKGROUND

The subject matter of the present disclosure broadly relates to the art of suspension systems and, more particularly, to a gas suspension member adapted to interconnect with a gas transmission line as well as a method of forming such a gas suspension member.

The subject matter of the present disclosure finds particular application in association with gas suspension members used on suspension systems of vehicles, and will be discussed herein with particular reference thereto. However, it will be appreciated that the subject gas suspension member and method are equally applicable for use in other applications and environments, and are not intended to be in any way limited to use in the applications discussed herein, which are merely exemplary.

Gas suspension members having an inlet for connecting a gas transmission line are generally well known. One example of such a gas suspension member is disclosed in U.S. Pat. No. 6,145,894 to Myers, which is hereby incorporated herein by reference in its entirety.

Gas suspension members have been commonly used in a wide variety of applications, such as vehicle suspension systems, for example, with great success. Gas suspension members for vehicle suspension systems are available in a wide variety of types, styles and configurations, including those with rigid end members as well as designs with flexible end walls. Though numerous advantages exist with the regard to the use of gas suspension members in vehicle suspension systems, there are also areas for improvement, such as reducing maintenance or increasing the ease of installation, for example.

One such opportunity for improvement exists in gas suspension members that have flexible end walls. Vehicle suspension systems by their very nature are designed to permit dynamic movement between various portions and components of the vehicle. As such, it is common for parts associated therewith to be repeatedly flexed or stressed. Gas suspension members are one example of such parts, and those having flexible end walls are typically well adapted for such flexing action.

Connection of such fluid suspension members to a fluid supply is typically accomplished through a fitting installed on the end wall of the fluid suspension member, as is shown in the Myers '894 patent, for example. The fitting, which is commonly made from metal, forms a fluid-tight seal with the flexible end wall on which it is installed. Repeated flexing of the end wall, however, can, in some cases, cause the flexible material surrounding the fitting to become separated from the connector fitting. This typically compromises the seal around the connector fitting, resulting in pressurized gas loss, which can reduce performance and/or efficiency of the suspension system among other problems.

One significant source of separation is caused by inflation-induced stresses along the flexible wall on which the fitting is installed. That is, the opposing end walls of the gas suspension member become somewhat crowned or dome-shaped due to the pressure within the gas suspension member. The nature of the deflection and the typical positioning of the fitting on the end wall can cause any forces that would otherwise act to seal against the fitting to be overcome. This can undesirably result the loss of integrity of the fluid-tight seal formed around the fitting.

Various arrangements have been employed to improve the interconnection between the connector fitting and the flexible end wall. One method has been to mold the connector fitting into the part during the manufacture of the flexible wall. Unfortunately, the mechanical properties of the wall material alone have been found to be insufficient to consistently withstand the separation stresses discussed above. As such, even with residual compressive stresses attributable to the overmolding process, this connection method has not been successful on a consistent basis. Another method that has been used to improve the interconnection between the connector fitting and the surrounding flexible material includes the use of adhesive. Though this arrangement significantly strengthens the interconnection between the connector fitting and the flexible wall, the adhesive and process of applying the same cause undesirable increases in manufacturing costs among other disadvantages.

Another example of a gas suspension member that has been successful in improving the interconnection between a connector fitting and the flexible end wall is disclosed in U.S. Pat. No. 7,270,317 to Leonard, which is hereby incorporated herein by reference in its entirety. Broadly speaking, the '317 patent discloses an arrangement in which a groove is formed along the flexible end wall of the gas suspension member adjacent a portion of the end wall that sealingly engages the connector fitting. This arrangement permits the end wall to flex while the transmission of separation-causing forces to the portion of the end wall that sealingly engages the connector fitting is minimized or at least reduced.

Notwithstanding the success of the arrangement in the '317 patent as well as that of other known devices, it is remains desirable to pursue the development of gas suspension members and methods of manufacturing the same that further contribute to the art of gas spring devices.

BRIEF SUMMARY

A gas suspension assembly in accordance with the subject matter of the present disclosure is provided that includes a first suspension device having opposing first and second ends and a first longitudinally-extending axis extending between the first and second ends. The first suspension device includes a spring element extending helically about the first axis such that a plurality of coils is formed between the first and second ends. The plurality of coils at least partially defines an interior of the first suspension device. A second suspension device is disposed within the interior of the first suspension device. The second suspension device includes a first end wall formed from a first polymeric material that has a first value for a preselected material property and includes an opening extending through the first end wall. A second end wall is spaced from the first end wall such that a second longitudinally-extending axis is extends therebetween. The second axis is disposed in approximate alignment with the first axis of the first suspension device. A side wall is formed from the first polymeric material that has approximately the first value for the preselected material property. The side wall extends between the first and second end walls and at least partially defines a gas chamber therebetween. A third end wall extends across the opening in the first end wall and is secured thereto in a substantially fluid-tight manner. The third end wall is formed from a second polymeric material that has a second value for the preselected material property, which is different from the first value of the first polymeric material. A connector fitting is received within the third end wall such that a substantially fluid-tight seal is formed therewith. The connector fitting includes a passage that extends therethrough in fluid communication with the gas chamber, and has an open end that is adapted to receive and retain an associated gas transmission line.

A gas suspension member in accordance with the subject matter of the present disclosure is provided that includes a first end wall with an opening formed therethrough. A second end wall is spaced from the first end wall such that a longitudinally-extending axis extends therebetween. A side wall extends between the first and second end walls and at least partially defines a gas chamber therebetween. A third end wall is attached to the first end wall across the opening thereof. A connector fitting is at least partially embedded within the third end wall such that a substantially fluid-tight seal is formed along an interface between the connector fitting and the third end wall. The connector fitting includes a passage extending therethrough between opposing first and second open ends. The first open end is disposed outwardly of the gas chamber and is adapted to receive an associated gas transmission line. The first end wall has a first flexural stiffness and the third end wall has a second flexural stiffness that is greater than the first flexural stiffness such that the first end wall is more capable of flexing than the third end wall. This permits greater deflection of the first end wall with respect to the third end wall and reduces the transmission of separation-causing stresses from the first end wall to the interface between the connector fitting and the third end wall.

A method of forming a gas suspension member in accordance with the subject matter of the present disclosure is provided that includes forming a first section of a gas suspension member from a first polymeric material that has a first value for a pre-selected material property thereof. The first section has a first longitudinally-extending axis and includes a first end wall that extends approximately transverse to the first axis and a first side wall that extends from along the first end wall generally lengthwise along the first axis. The first end wall and the first side wall each include an inner surface that at least partially defines an inner chamber of the first section. The first end wall includes an opening formed therethrough. The method also includes forming a second section of the gas suspension member from the first polymeric material that has the first value for the pre-selected material property thereof. The second section includes a second end wall. The method further includes providing a connector fitting for receiving and retaining a gas transmission line. The connector fitting includes a fluid passage extending therethrough. The method also includes forming a cover wall from a second polymeric material that has a second value for the pre-selected material property thereof. The method further includes embedding the connector fitting within the cover wall such that the fluid passage extends through the cover wall. The method also includes positioning the cover wall along the inner surface of the first end wall of the first section from within the inner chamber thereof and securing the cover wall along the inner surface of the first end wall across the opening such that the passage of the connector fitting is in communication between the opening and the inner chamber. The method further includes attaching the first and second sections together to form a substantially fluid-tight joint therebetween.

DETAILED DESCRIPTION

Figure 1:
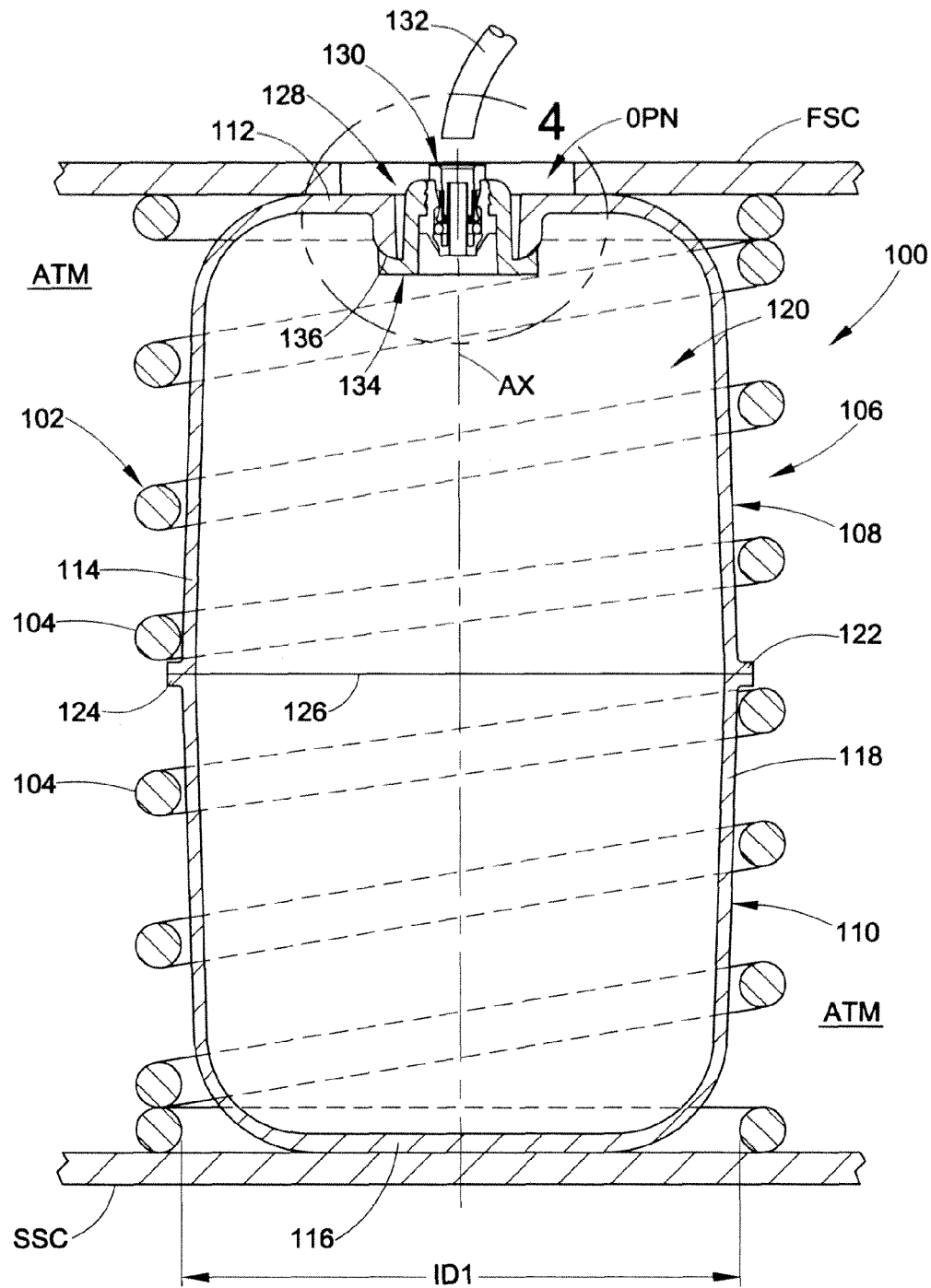
FIG. 1 is a side view, in cross section, of one embodiment of a gas suspension member in accordance with the subject matter of the present disclosure shown in use on a vehicle suspension system.

Turning now to drawings wherein the showings are for the purpose of illustrating preferred embodiments of the subject matter of the present disclosure only and which showings are not to be construed as being in any way limiting, FIG. 1 illustrates a gas suspension assembly 100 that includes first and second suspension elements or devices supported between opposing structural members, such as first and second structural components FSC and SSC of an associated vehicle (not shown), for example. In the exemplary arrangement shown in FIG. 1, gas suspension assembly 100 includes a conventional compression spring 102 that is formed from a spring element (e.g., a length of metal wire or rod) having a plurality of coils 104 that extend circumferentially about a longitudinally-extending axis AX. An interior area (not numbered) is provided within the plurality of coils, such as may be defined within inside dimension ID1, for example.

Gas suspension assembly 100 also includes a gas suspension member 106 in accordance with the subject matter of the present disclosure that is dimensioned for receipt within the interior area of compression spring 102. Gas suspension member 106 also has a longitudinally-extending axis AX and includes a first or upper section 108 and a second or lower section 110. Upper section 108 includes a first or upper end wall 112 that extends in a generally transverse orientation (e.g., perpendicular) with respect to axis AX and a first or upper side wall 114 that extends from the upper end wall in a generally lengthwise orientation (e.g., in approximate alignment) along axis AX. Lower section 110 is shown in FIG. 1 as including a second or lower end wall 116 that extends in a generally transverse orientation (e.g., perpendicular) with respect to axis AX. Lower section 110 can optionally include one or more additional features, such as a second or lower side wall 118 that extends from the lower end wall in a generally lengthwise orientation (e.g., in approximate alignment) along axis AX. In the exemplary arrangement shown, sections 108 and 110 are generally circular in cross section. However, it will be appreciated that any other shape and/or arrangement could alternately be used.

Upper end wall 112 and upper side wall 114 at least partially define a gas chamber 120 within gas suspension member 106 that is capable of maintaining a quantity of pressurized gas at a gas pressure that is greater than that of the surrounding ambient atmosphere ATM. In the exemplary arrangement shown, gas chamber 120 is established by the upper and lower sections acting together, such as, for example, between upper and lower end walls 112 and 116 and within upper and lower side walls 114 and 118. In the exemplary arrangement shown, the upper and lower sections of gas suspension member 106 are secured to one another to form gas suspension member 106. This can be accomplished in any suitable manner. As one example, first and second sections 108 and 110 can respectively include radially-outwardly extending annular flanges 122 and 124 that are formed along side walls 114 and 118 thereof. In the exemplary embodiment shown, flanges 122 and 124 are disposed generally opposite end walls 112 and 116. Sections 108 and 110 are shown in FIG. 1 as being connected along flanges 122 and 124 at joint 126 and together define gas chamber 120. It will be appreciated that the sections can be secured together in any suitable manner, such as by hot plate welding, spin welding, ultrasonic welding and/or using adhesive, for example.

Gas suspension member 106 includes a gas transfer connection, shown generally at 128, that is provided along upper end wall 112. Gas transfer connection 128 is shown in FIGS. 1-6 as including a push/pull-type connector, which is generally indicated by item number 130. It will be recognized that the general structure and principles of operation of such push-pull type connectors are well known. Additionally, it will be appreciated that a connector fitting or device of any other suitable type, kind, configuration and/or construction could alternately be used. Any such connector fitting will preferably be adapted to receive and retain an associated gas transmission line, such as gas transmission line 132 in FIG. 1, for example. Access to gas transfer connection 128 can be provided in any suitable manner, such as by way of an opening OPN in first structural component FSC, as shown in FIG. 1, for example.

In one preferred arrangement, the connector fitting of whichever type and/or kind that is provided, such as connector fitting 130, for example, is received on or at least partially embedded within a cover wall 134, which may also be referred to herein as a third end wall. In a preferred arrangement, the cover wall is formed separately from the upper end wall and is secured on or otherwise attached to upper end wall 112 such that a substantially fluid-tight joint 136 is formed therebetween. As will be discussed in greater detail hereinafter, first end wall 112 and cover wall 134 will preferably have two different flexural stiffnesses such that the first end wall will be more capable of flexing than the cover wall. This can be achieved in any suitable manner, such as, for example, by forming the two walls from two different polymeric materials (or two different grades of a common polymeric material). As another example, the two walls could have different geometric characteristics (e.g., thicknesses) that would result in the desired variation in flexural stiffness.

Figure 2:
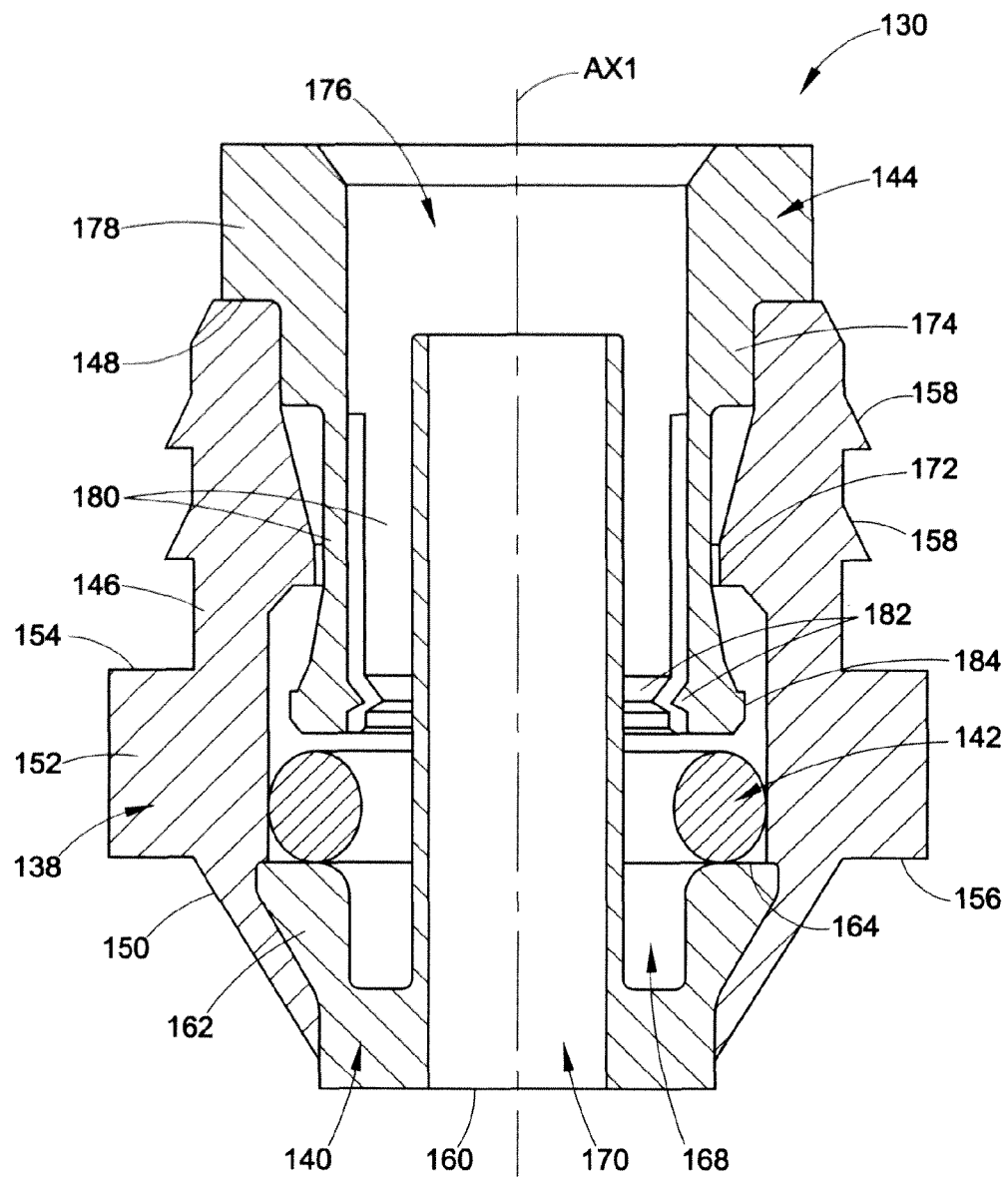
FIG. 2 is an enlarged side view of the connector fitting shown in FIG. 1.

Turning now to FIG. 2, connector fitting 130 includes a connector body 138, an inner support member 140, a sealing member, such as an o-ring 142, for example, and a retaining member 144, which are together approximately co-axially arranged about axis AX1. Connector body 138 includes a substantially cylindrical body wall 146 extending between an end wall 148 and a frustoconical support wall 150. A flange 152 extends radially outwardly from body wall 146 adjacent support wall 150 and has opposing annular faces 154 and 156. A plurality of retaining features, such as annular barbs 158, for example, are provided along body wall 146 for interengaging the material of cover wall 134 at a substantially fluid-tight interface therebetween.

Inner support member 140 includes a bottom wall 160 and a frustoconical support wall 162 extending radially outwardly from bottom wall 160 and terminating at an opposing end wall 164. An inner support wall 166 extends from bottom wall 160 and is spaced radially inwardly from frustoconical support wall 162 forming an axially extending annular groove 168 between support walls 162 and 166. A fluid passage 170 is at least partially defined by inner support wall 166 and extends through bottom wall 160. Frustoconical support wall 162 of inner support member 140 is in abutting engagement with support wall 150 of connector body 138. End wall 164 of the inner support member acts as a shoulder that supports o-ring 142.

An annular projection 172 extends radially inwardly from body wall 146 of connector body 138 and is cooperable with retaining member 144, as will be discussed below. Retaining member 144 includes a generally cylindrical wall 174 having a passage 176 formed therethrough that is in communication with fluid passage 170 to form a fluid pathway (not numbered) through connector fitting 130. A flange 178 extends radially outwardly from wall 174 adjacent end wall 148 of connector body 138. A plurality of fingers 180 are separated by slots (not numbered) and extend from wall 174 opposite flange 178. A barb 182 is provided on each finger along passage 176 for engaging the exterior of a length of tubing (not shown), such as gas transmission line 132 in FIG. 1, for example. Opposite barbs 182 on the outer surface of each finger 180 is a shoulder 184 operative to engage projection 172 and radially-inwardly displace the fingers such that barbs 182 engage the exterior of the tubing (not shown) to grip and retain the same within the connector.

Figure 3:
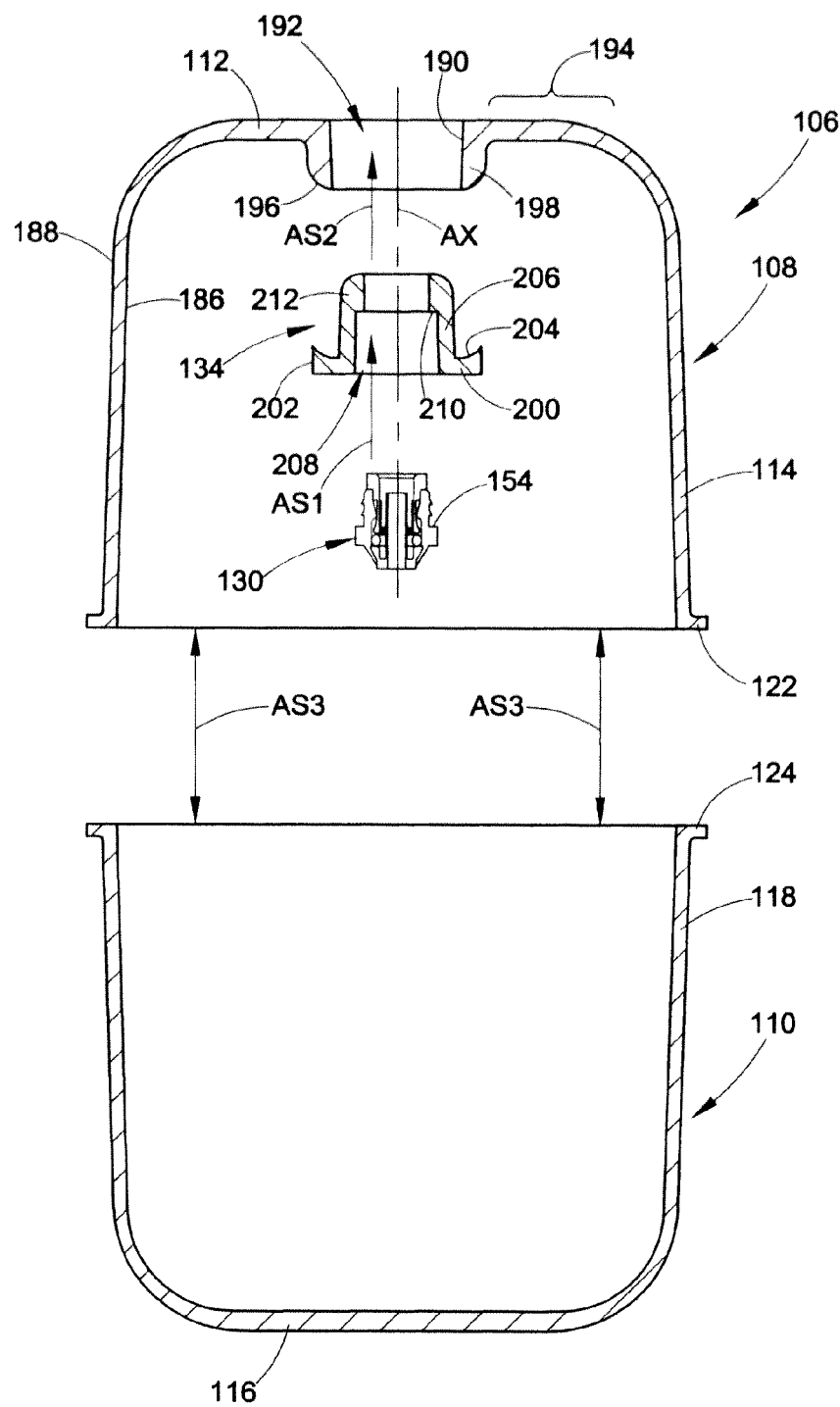
FIG. 3 is a side view, in cross section, of the gas suspension member in FIG. 1 prior to assembly.

FIG. 3 illustrates the components of gas suspension member 106 prior to assembly. First or upper section 108 and second or lower section 110 are provided separately from one another. Additionally, cover wall 134 and connector fitting 130 are also shown in FIG. 3 as being separately provided. It will be appreciated, however, that in other cases the cover wall and connector fitting could, alternatively, be provided in an assembled configuration. For example, the cover wall could be formed by molding a quantity of the second polymeric material around a portion of the connector fitting (e.g., over-molding a fitting body or housing with the second polymeric material).

First section 108 includes an interior surface 186 and an opposing exterior surface 188 that extend along at least a portion of first end wall 112 and first side wall 114. First end wall 112 also includes an inner wall portion 190 that at least partially defines an opening 192 formed through first end wall 112. An outer wall portion of first end wall 112 is disposed radially-outwardly of and extends peripherally about inner wall portion 190. The outer wall portion is generally identified in FIGS. 3-6 by item number 194. Inner wall portion 190 as projecting axially-inwardly with respect to outer wall portion 194 and includes a first joint surface 196 disposed along an axially-distal extent or end 198 of inner wall portion 190.

As discussed above, cover wall 134 is provided separately from first section 108 and is shown in FIGS. 1 and 3-6 as including a first or base wall portion 200 that at least partially defines an outer peripheral wall 202 and a second joint surface 204 formed therealong. Cover wall 134 also includes a second or inside wall portion 206 that at least partially defines a passage 208 that extends through the cover wall. A shoulder wall portion 210 can optionally extend radially-inwardly from along inside wall portion 206 to at least partially define a ring wall or connector-engaging portion 212 suitable for receiving and retaining connector fitting 130 in a substantially fluid-tight manner at an interface (not numbered) therebetween.

Figure 4:
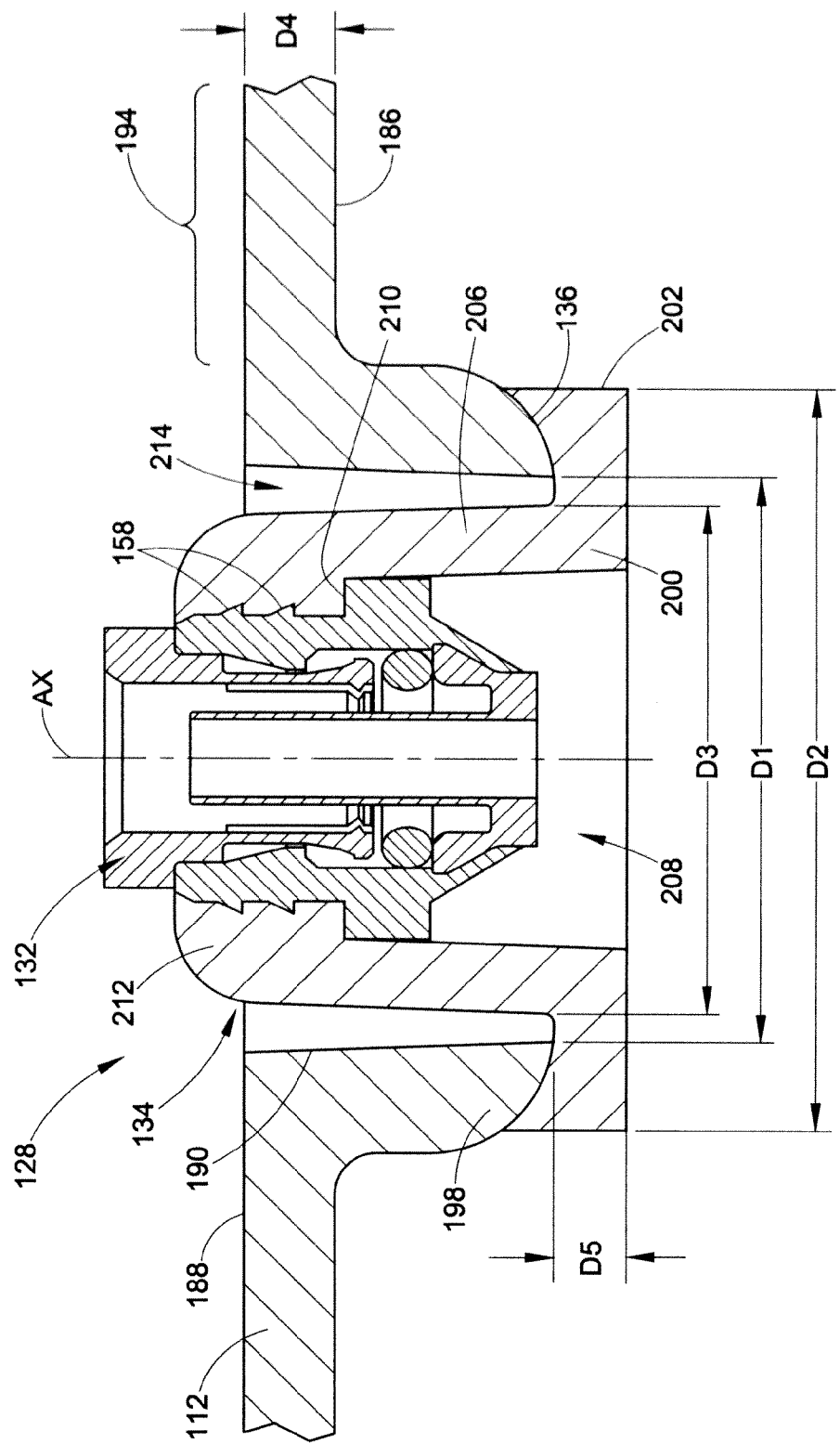
FIG. 4 is an enlarged view of Detail 4 of the gas suspension member shown in FIG. 1.

As can be more clearly seen from FIG. 4, opening 192 (FIG. 3), which is at least partially defined by inner wall portion 190 of first end wall 112, has a nominal cross-sectional dimension, such as an inside diameter, for example, that is generally indicated by reference dimension D1. Base wall portion 200 is also shown in FIG. 4 as having a nominal cross-sectional dimension, such as an outside diameter, for example, that is generally indicated by reference dimension D2. In a preferred arrangement, the peripheral extent of cover wall 134 (e.g., the cross-sectional dimension of outer peripheral wall 202) will be sufficiently greater than the peripheral extent of opening 192 (e.g., a diameter represented by dimension D1) to permit base wall portion 200 to overlap inner wall portion 190, which will thereby permit the formation joint 136 therebetween. Additionally, inside wall portion 206 of cover wail 134 has a nominal cross-sectional dimension, such as an outside diameter, for example, that is generally indicated by reference dimension D3. In one preferred arrangement, the peripheral extent of inside wall portion 206 (e.g., an outside diameter represented by dimension D3) will be sufficiently less than the peripheral extent of opening 192 (e.g., a diameter represented by dimension D1) that a groove 214 is formed therebetween.

Cover wall 134 and inner wall portion 190 are shown herein as extending generally circumferentially about a longitudinally-extending axis AX and, thus, can be disposed in a generally co-axial relationship with other features of the gas suspension member (e.g., side walls 114 and 118). However, it will be appreciated that any other shape, configuration and/or arrangement could alternately be used. For example, gas transfer connection 128 could be offset from or otherwise disposed in spaced relation to axis AX. Additionally, the geometric features and/or characteristics of the various walls and wall portions of first section 108, second section 110 and/or cover wall 134 can differ from structural element-to-structural element depending upon the desired performance and/or operational characteristics of the resulting gas suspension member, as will be discussed hereinafter with regard to FIGS. 5 and 6. For example, first end wall 112 can have a first nominal wall thickness along inner wall portion 190 and/or outer wall portion 194, such as is represented by reference dimension D4 in FIG. 4, for example, which thickness could be selected in relation to the desired flexural stiffness of the first end wall. Cover wall 134 can have a second nominal wall thickness along base wall portion 200 and/or inside wall portion 206, such as is represented by reference dimension D5 in FIG. 4, for example, which thickness could be selected in relation to the desired flexural stiffness of the cover wall.

Furthermore, the material (or material properties and/or characteristics) from which the various walls and wall portions of first section 108, second section 110 and/or cover wall 134 are formed can also, or alternatively, differ depending upon the desired performance and/or operational characteristics of the resulting gas suspension member, as will be discussed hereinafter with regard to FIGS. 5 and 6. That is, first section 108 and second section 110 could, for example, be formed from a first polymeric material that has a first value for a pre-selected material property, such as tensile strength, modulus of elasticity or hardness, for example. Cover wall 134 could be formed from a second polymeric material that has a second value for the pre-selected material property with the second value being different (i.e., greater than or less than) the first value for that pre-selected material property. Such first and second polymeric materials could be selected from different families of materials. Or, such first and second polymeric materials could be selected from different grades of a common family of materials. One exemplary group of materials from which the different polymeric materials could be selected includes polyolefins, polyurethanes, polyethylenes, polypropylenes and polyvinyl chlorides.

In one preferred embodiment, the pre-selected material property is hardness and the variation in flexural stiffness of the first and second polymeric materials (or grades of a common family of polymeric materials) is at least partially related or otherwise associated with or attributable to the different hardness values thereof. While it will be recognized that any suitable values or range of values can be used for the pre-selected material property, one exemplary range of hardness values for a first polymeric material is from approximately 70 Shore A to approximately 90 Shore A. A corresponding exemplary range for a second polymeric material is from approximately 40 Shore D to approximately 70 Shore D. As discussed above, however, the use of hardness values as the pre-selected material property, while preferred in one embodiment, is merely exemplary and any other suitable material property or combination of material properties could alternately be used.

Figure 5:
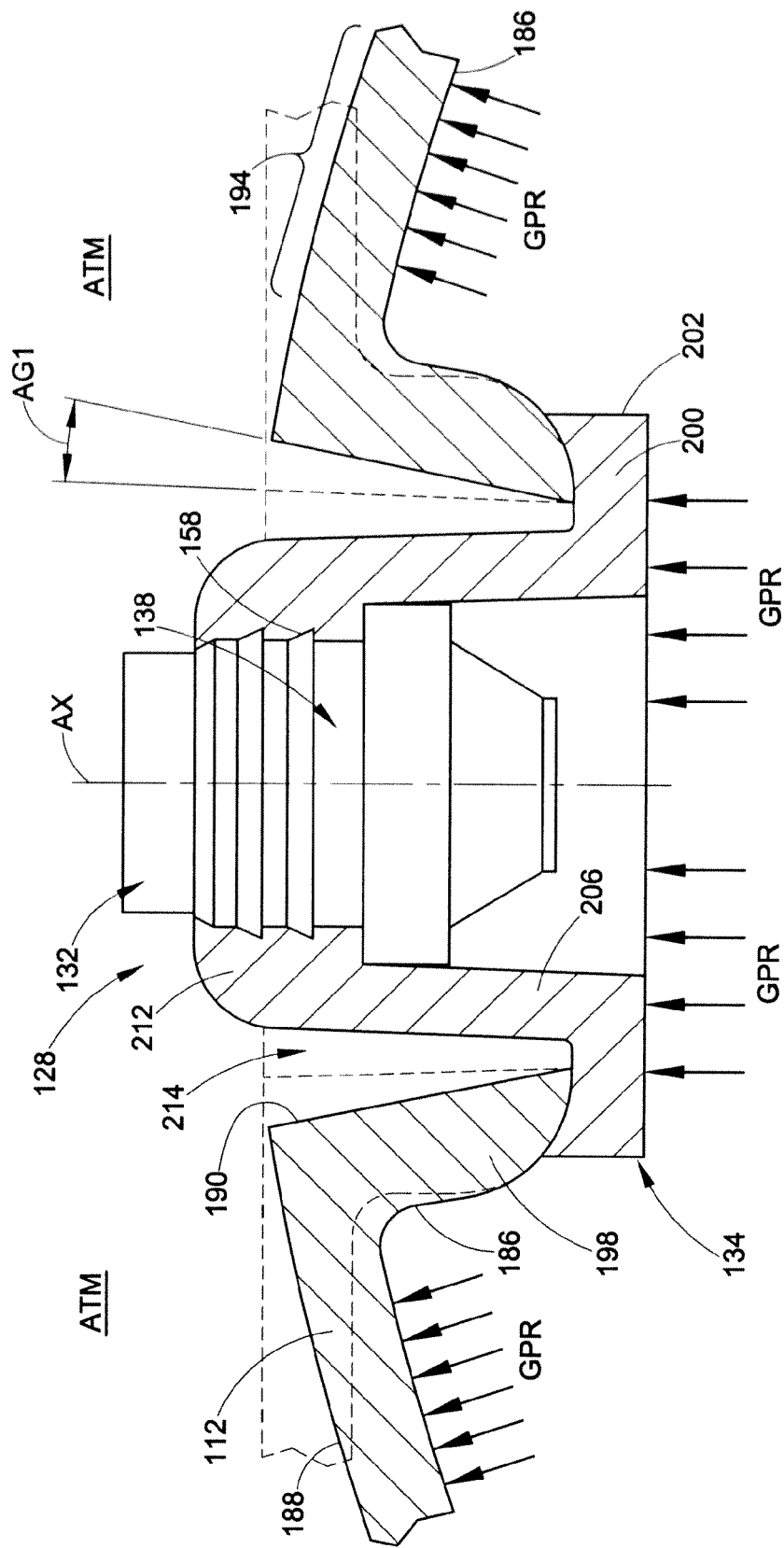
FIG. 5 is a view of the end wall and connector fitting in FIG. 4 shown undergoing inflation induced deflection.
Figure 6:
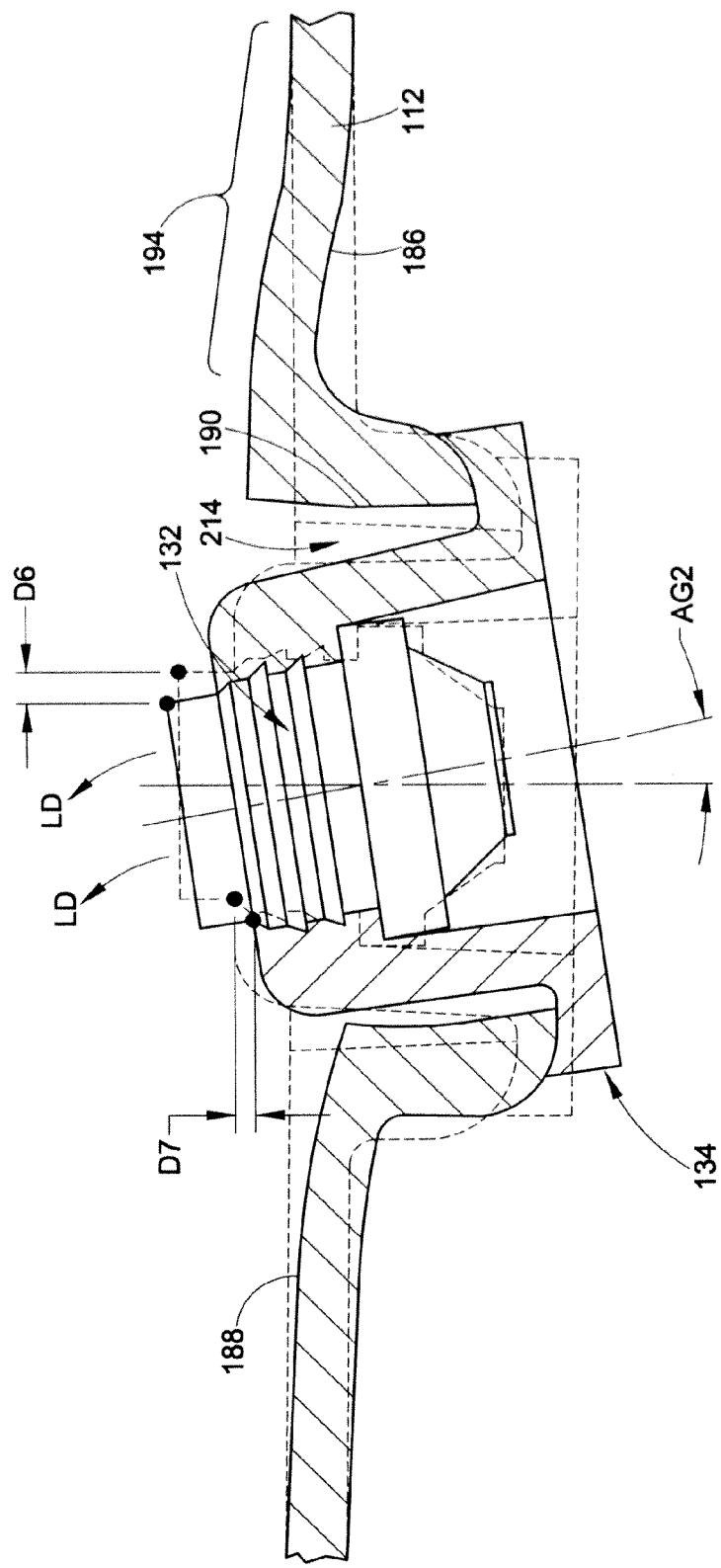
FIG. 6 in a view of the end wall and connector fitting in FIG. 4 shown undergoing a deflection induced by an external load.

Turning, now, to FIGS. 5 and 6, first end wall 112 is shown in two different deflected conditions. The deflection shown in FIG. 5 may result from the inflation of a gas suspension member (e.g., gas suspension member 106) that has a flexible end wall (e.g., first end wall 112), such as into an extended condition in which contact with first structural component FSC is reduced, for example. The deflection of first end wall 112 in FIG. 5 is shown as being at least partially due to the pressure of a quantity of gas retained within the gas chamber of the gas suspension member, as is indicated by arrows GPR. The gas pressure acts on only one side of first end wall 112, namely along interior surface 186, with ambient atmospheric pressure ATM acting along exterior surface 188 of the first end wall. It is, of course, well understood that the gas pressure acts uniformly on or along the surfaces of all of the other wall surfaces forming the gas chamber of the gas suspension member as well. However, with gas pressure GPR typically being substantially greater than ambient atmospheric pressure ATM, the pressure differential is shown in FIG. 5 as acting to deflect the first end wall outwardly into a crowned or domed shape, particularly along outer wall portion 194 thereof. Such inflation induced-deflection causes corresponding inflation-induced stresses along the walls of the gas suspension member, including first end wall 112. These inflation-induced stresses normally include tensile stresses acting at least along the exterior surfaces of the first end wall.

In known suspension members and in certain conditions, such as high operating pressures, stresses in the material of the first end wall around the connector fitting can reach relatively high levels. In such situations, proportionally high strains occur in these areas that cause the material adjacent the connector fitting to separate from the connector fitting. This can undesirably result in at least a partial loss of seal integrity around and along the connector fitting. The subject matter of the present disclosure allows the material around and along the connector fitting (e.g., cover wall 134) to be of a greater stiffness than that of the first end wall. This acts to reduce the amount of strain in the area adjacent the connector fitting under the same high stress levels. This reduction in strain assists in minimizing or at least reducing the aforementioned separation at or along the connector fitting. Such an arrangement also allows the first end wall to maintain functionality through the use of a material that has a lower relative stiffness than that of the cover wall.

As shown in FIG. 5, the influence of gas pressure GPR generates inflation-induced stresses that axially-outwardly deflect outer wall portion 194 of first end wall 112. As discussed above, cover wall 134 will preferably have a greater flexural stiffness in comparison with that of first end wall 112. As such, reduced deflection of cover wall 134 due to the influence of gas pressure GPR is expected in comparison with the deflection of the first end wall. In the exemplary embodiment shown in FIG. 5, one extent or end (not numbered) of inner wall portion 190 is integrally formed with outer wall portion 194. The opposing extent or end of the inner wall portion, which is identified herein as axially-distal extent 198, is fixedly attached to base wall portion 200 of cover wall 134. As such, inner wall portion 190 is shown as undergoing substantial deflection which transitions between the relatively undeflected cover wall and the substantially deflected outer wall portion of the first end wall. The deflection of inner wall portion 190 results in a corresponding deformation of groove 214, such as by the groove dilating or opening outwardly, for example, as indicated by angle AG1. Due, at least in part to this difference in flexural stiffness, the compressive stresses in the material of connector-engaging portion 212 that extends around connector body 138 of connector fitting 132 maintains a substantially fluid-tight seal along this interface therebetween.

Additionally, groove 214 and inner wall portion 190 can act as a stress relief for externally applied loads acting on the connector, such as from the inadvertent tensioning of a gas transmission line or tubing (not shown), for example. In FIG. 6, gas transfer connection 128 is shown in a deflected condition due to a load, shown by arrows LD, applied on the connector fitting. Groove 214, inner wall portion 190 and outer wall portion 194 permit cover wall 134 as well as connector fitting 132 to deflect in any direction or combination of directions, including laterally as indicated by dimension D6, vertically as indicated by dimension D7 or torsionally as indication by angular dimension AG2 without adversely affecting substantially fluid-tight interface between the connector fitting and the material of cover wall 134.

It will be appreciated that the illustrations in FIGS. 5 and 6 are merely exemplary of typical loads and end wall deflections, and of the response to such loads and deflections that would be expected from an end wall of a gas suspension member in accordance with the subject matter of the present disclosure. Additionally, it will be recognized that some combination of the loads and deflections illustrated in each of FIGS. 5 and 6 will likely be present during use of the subject gas suspension member. Furthermore, it will be understood by the skilled artisan that the various wall thicknesses and other dimensions shown and described, particularly those of first end wall 112 and cover wall 134, can be adapted or modified to provide the desired deflection and stress relief depending upon numerous other factors, such as anticipated loads, environmental conditions and mechanical properties of the material, for example.

Figure 7:
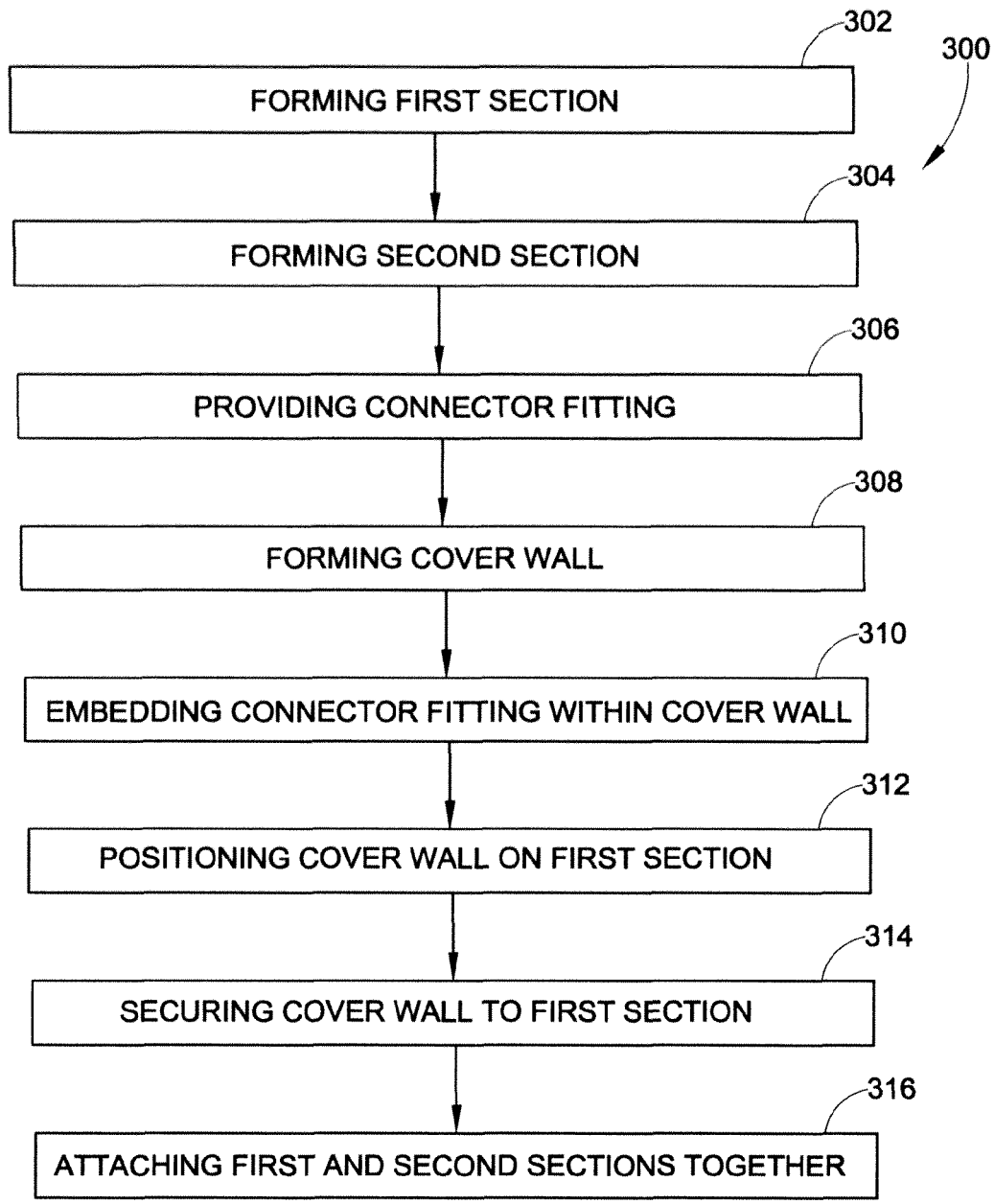
FIG. 7 is a graphical representation of one exemplary method of forming a gas suspension member in accordance with the subject matter of the present disclosure.

FIG. 7 graphically represents one exemplary method 300 of assembling a gas suspension member in accordance with the subject matter of the present disclosure. Method 300 includes forming or otherwise providing a first section of a gas suspension member, such as first section 108 of gas suspension member 106, for example, as is indicated by box 302 in FIG. 7. In one preferred arrangement, the first section will include at least a first end wall (e.g., first end wall 112) that has a first flexural stiffness, such as due to a pre-selected material property (e.g., tensile strength or hardness) and/or due to a given geometric configuration of the first end wall (e.g., the wall thickness). Method 300 also includes forming or otherwise providing a second section of the gas suspension member, such as second section 110, for example, as is indicated by box 304. In one preferred embodiment, the second section will be formed from the same or a substantially similar material to that of the first section, as described above.

Method 300 further includes providing a connector fitting of any suitable type, kind, configuration and/or construction, such as connector fitting 132, for example, as indicated by box 306. The method also includes forming a cover wall that has a second flexural stiffness, as is indicated by box 308 in FIG. 7, such as may be due to having a different value for the pre-selected material property (e.g., tensile strength or hardness) and/or to having a different geometric configuration than that of the first end wall.

Method 300 also includes embedding the connector fitting within the cover wall, as indicated by box 310. It will be appreciated that this can be accomplished in any suitable manner. As one example, such an action can include press fitting connector 132 into passage 208 of cover wall 134, as is generally indicated by arrow AS1 in FIG. 3, for example. In one preferred embodiment, connector fitting 132 can be oriented such that retaining member 144 extends through cover wall 134 and face 154 of flange 152 engages shoulder wall portion 210 of cover wall 134. By being pressed into abutting engagement with shoulder wall portion 210, flange 152 prevents the connector from being pulled through and out of passage 208 due to loads applied to the gas transmission line or tubing (not shown). Alternately, connector body 138 could be pressed into passage 208 without the other components of connector fitting 132. These other components can then be inserted in a later step from the exterior of the fluid suspension member once assembled.

With further reference to the foregoing example, connector fitting 132 can be pressed into passage 208 such that barbs 158 on connector body 138 embed into ring wall 212 to retain the connector thereon. Preferably, the diameter of passage 208 is less than the diameter of body wall 146 of connector body 138. Thus, when the connector body is pressed into the passage during assembly, the material of retention ring wall 212 is highly stressed and forms a fluid-tight compressive seal around the connector body. Therefore, it may be possible to avoid the use of other sealing techniques, such as the use of adhesives, for example.

As another example of embedding the connector fitting within the cover wall, connector fitting 132 or a portion thereof, such as connector body 138, for example, could be inserted into a suitable plastic mold and cover wall 134 can be overmolded or otherwise formed around the connector fitting or component thereof. In such an example, actions 308 and 310 could be performed substantially simultaneously in a single operation. However, if the connector body alone (or some lesser number of components than that of the full connector fitting) is overmolded, some assembly of additional parts and/or components can optionally be performed.

Method 300 also includes positioning the cover wall on or along the first end wall, such as across opening 192 formed therein as is represented by arrow AS2 in FIG. 3, for example, as is indicated by box 312 in FIG. 7. In one preferred arrangement, such an action includes orienting the cover wall such that a portion thereof (e.g., base wall portion 200) is disposed along an interior surface of the first end wall (e.g., joint surface 196 of inner wall portion 190). It will be appreciated that such an action would be performed by accessing the interior surface from the open end of the first section. Method 300 also includes securing the cover wall on the first end wall such that a substantially fluid-tight joint (e.g., joint 136) is formed therebetween, as indicated by box 314. Such a joint can be formed in any suitable manner, such as by ultrasonic welding, hot plate welding, spin welding and/or using adhesive, for example. Furthermore, it will be appreciated that actions 312 and 314 can be performed either before or after action 310 of embedding the connector fitting within the cover wall. That is, the cover wall could be formed in action 308 and then positioned and secured to the first end wall, as discussed with regard to actions 312 and 314. Thereafter, action 310 of embedding the connector fitting into the cover wall could be performed.

Since connector fitting 132 is shown as being installed from within the interior of first section 108, method 300 further includes positioning the first and second sections together (e.g., first and second sections 108 and 110) such that the second section extends across or otherwise closes the open end of the first section, as indicated generally by arrows AS3 in FIG. 3. Method 300 also includes securing or otherwise attaching the first and second sections together, as is indicated by box 316 in FIG. 7, such as by forming a substantially fluid-tight joint 126 therebetween. Joint 126 can be formed in any suitable manner, such as by welding, using adhesive or one or more mechanical fasteners, for example. In one exemplary embodiment, first and second sections 108 and 110 are molded from a polymeric material, such as polyurethane, for example, and joint 126 is formed by welding flanges 122 and 124 together using a suitable welding method well known by skilled artisans, Examples of such welding methods include ultrasonic welding, hot plate welding and spin welding. It will be appreciated, however, that any suitable material or materials can be used and that any suitable method of joining the same can also be used.

It is to be distinctly understood that the geometry, configuration and arrangement of gas transfer connection 128, generally, and of groove 214, inner wall portion 190 and cover wall 134, more specifically, are merely exemplary embodiments of suitable geometry, and that any other suitable geometry can be used without departing from the principles of the present novel concept. For example, the present embodiments show and describe a substantially cylindrical fluid suspension member having a central axis with the groove extending substantially coaxially with the connector, which is installed along the end wall in approximate alignment with the central axis. However, in other applications the connector may be secured on the end wall in spaced relation (i.e., offset) to the central axis. Preferably, the groove and inner wall portion of the end wall will remain disposed substantially around the connector. Additionally, the groove can have any suitable depth-to-width ratio, can take any suitable form or shape.

As used herein with reference to certain elements, components and/or structures (e.g., "first side wall" and "second side wall"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

I claim:

1. A gas suspension assembly comprising:
a first suspension device having opposing first and second ends and a first longitudinally-extending axis extending between said first and second ends, said first suspension device including a spring element extending helically about said first axis such that a plurality of coils are formed between said first and second ends, said plurality of coils at least partially defining an interior of said first suspension device; and,
a second suspension device disposed within said interior of said first suspension device, said second suspension device including:
a first end wall formed from a first polymeric material having a first value for a preselected material property and including an opening extending therethrough;
a second end wall spaced from said first end wall such that a second longitudinally-extending axis extends therebetween, said second axis disposed in approximate alignment with said first axis of said first suspension device;
a side wall formed from said first polymeric material having approximately said first value for said preselected material property thereof, said side wall extending between said first and second end walls and at least partially defining a gas chamber therebetween;
a third end wall extending across said opening in said first end wall and secured thereto in a substantially fluid-tight manner, said third end wall formed from a second polymeric material having a second value for said preselected material property that is different from said first value of said first polymeric material; and,
a connector fitting received within said third end wall such that a substantially fluid-tight seal is formed therewith, said connector fitting including a passage extending therethrough in fluid communication with said gas chamber and an open end adapted to receive and retain an associated gas transmission line.

2. A gas suspension assembly according to claim 1, wherein said preselected material property is hardness, said first value of said hardness is within a range of from approximately 70 Shore A to approximately 90 Shore A, and said second value of said hardness is within a range of from approximately 40 Shore D to approximately 70 Shore D.

3. A gas suspension assembly according to claim 1, wherein said first and second polymeric materials are from a common family of materials.

4. A gas suspension assembly according to claim 3, wherein said common family of materials is selected from the group consisting of polyolefin, polyurethane and polypropylene.

5. A gas suspension assembly according to claim 1, wherein said second end wall is formed from said first polymeric material having approximately said first value for said preselected material property.

6. A gas suspension assembly according to claim 1, wherein said first suspension device includes a steel compression spring.

7. A gas suspension member comprising:
a first end wall including an opening formed therethrough;
a second end wall spaced from said first end wall such that a longitudinally-extending axis extends therebetween;
a side wall extending between said first and second end walls and at least partially defining a gas chamber therebetween;

a third end wall attached to said first end wall across said opening thereof; and, a connector fitting at least partially embedded within said third end wall such that a substantially fluid-tight seal is formed along an interface between said connector fitting and said third end wall, said connector fitting including a passage extending therethrough between opposing first and second open ends, said first open end disposed outwardly of said gas chamber and adapted to receive an associated gas transmission line;

said first end wall having a first flexural stiffness and said third end wall having a second flexural stiffness that is greater than said first flexural stiffness such that said first end wall is more capable of flexing than said third end wall thereby permitting greater deflection of said first end wall with respect to said third end wall and reducing transmission of separation-causing stresses from said first end wall to said interface between said connector fitting and said third end wall.

8. A gas suspension member according to claim 7, wherein said first end wall is formed from a first polymeric material having a first hardness and said third end wall is formed from a second polymeric material that is different from said first polymeric material and having a second hardness that is greater than said first hardness of said first polymeric material.

9. A gas suspension member according to claim 8, wherein said first hardness is within a range of from approximately 70 Shore A to approximately 90 Shore A, and said second hardness is within a range of from approximately 40 Shore D to approximately 70 Shore D.

10. A gas suspension member according to claim 8, wherein said first polymeric material and said second polymeric materials comprise different grades of polymeric materials from a common family of polymeric materials.

11. A gas suspension member according to claim 10, wherein said common family of polymeric materials is selected from the group consisting of polyolefin, polyurethane and polypropylene.

12. A gas suspension member according to claim 7, wherein said first end wall has a first nominal thickness and said third end wall has a second nominal thickness that is greater than said first nominal thickness, said first flexural stiffness having a relation to said first nominal thickness and said second flexural stiffness having a relation to said second nominal thickness such that the greater value of said second nominal thickness contributes to the greater flexural stiffness of said third end wall with respect to said first nominal thickness of said first end wall.

13. A gas suspension member according to claim 7, wherein said first end wall includes an inner surface at least partially defining said gas chamber and an outer surface disposed outwardly of said gas chamber, said third end wall extending along said inner surface of said first end wall such pressurized gas within said gas chamber urges said third end wall against said inner surface of said first end wall.

14. A gas suspension member according to claim 13, wherein said first end wall includes an inner wall portion that at least partially defines said opening in said first end wall and an outer wall portion disposed radially-outwardly of said inner wall portion, said inner wall portion extending axially-inwardly with respect to said outer wall portion thereby forming an axially-distal extent of said inner wall portion of said first end wall, said third end wall secured along said axially-distal extent of said inner wall portion of said first end wall.

15. A gas suspension member according to claim 14, wherein said third end wall includes a base wall portion and connector-engaging portion, and said base wall portion abuttingly engages said axially-distal extent of said inner wall portion of said first end wall and is attached thereto.

16. A gas suspension member according to claim 15, wherein said connector-engaging portion extends axially-outwardly from said base wall portion such that a groove is formed between said inner wall portion of said first end wall and said connector-engaging portion of said third end wall.

17. A method of forming a gas suspension member, said method comprising:
a) forming a first section of a gas suspension member from a first polymeric material that has a first value for a pre-selected material property thereof, said first section having a first longitudinally-extending axis and including a first end wall extending approximately transverse to said first axis and a first side wall extending from along said first end wall generally lengthwise along said first axis, said first end wall and said first side wall each including an inner surface at least partially defining an inner chamber of said first section, and said first end wall including an opening formed therethrough;
b) forming a second section of said gas suspension member from said first polymeric material having said first value for said pre-selected material property thereof, said second section including a second end wall;
c) providing a connector fitting for receiving and retaining a gas transmission line, said connector fitting including a fluid passage extending therethrough;
d) forming a cover wall from a second polymeric material that has a second value for said pre-selected material property thereof;
e) embedding said connector fitting within said cover wall such that said fluid passage extends through said cover wall;
f) positioning said cover wall along said inner surface of said first end wall of said first section from within said inner chamber thereof and securing said cover wall along said inner surface of said first end wall across said opening such that said passage of said connector fitting is in communication between said opening and said inner chamber; and,
g) attaching said first and second sections together to form a substantially fluid-tight joint therebetween.

18. A method according to claim 17, wherein securing said cover wall in f) includes forming a substantially fluid-tight joint between said inside surface of said first end wall and said cover wall.

19. A method according to claim 17, wherein forming said first section in a) includes forming a first end wall that includes an outer wall portion and an inner wall portion projecting axially-inwardly from along said outer wall portion, and securing said cover wall in f) includes securing said cover wall on said inner wall portion such that a substantially fluid-tight joint is formed therebetween.

20. A method according to claim 19, wherein forming said cover wall in d) includes forming a cover wall that includes a base portion and a ring portion projecting axially-outwardly from said base portion, and embedding said connector fitting in e) includes embedding said connector fitting at least partially within said ring portion of said cover wall.

21. A method according to claim 20, wherein positioning said cover wall in f) includes orienting said cover wall such that said ring portion extends into said opening in said first end wall to thereby form a radially-outwardly extending groove between said ring portion and said inner wall portion of said first end wall.

* * * * *